United States Patent [19]
Akaba et al.

[11] Patent Number: 5,065,162
[45] Date of Patent: Nov. 12, 1991

[54] COMMUNICATION SYSTEM FOR HELICOPTER

[75] Inventors: Noriyuki Akaba; Hiroshi Yagi, both of Yokohama; Yoji Miyoshi, Tokyo, all of Japan

[73] Assignee: Tokyo Keiki Co., Ltd., Tokyo, Japan

[21] Appl. No.: 533,837

[22] Filed: Jun. 6, 1990

[30] Foreign Application Priority Data

Jun. 30, 1989 [JP] Japan .................................. 1-168699

[51] Int. Cl.$^5$ ............................................. G01S 5/02
[52] U.S. Cl. ..................................... 342/417; 342/74; 342/43; 342/50; 342/422; 244/17.17
[58] Field of Search ............... 342/417, 383, 384, 422, 342/442, 447, 37, 43, 48, 50, 418, 107, 74, 75; 244/17.17

[56] References Cited

U.S. PATENT DOCUMENTS

| | | | |
|---|---|---|---|
| 3,787,862 | 1/1974 | Jacobson | 342/418 |
| 4,115,771 | 9/1978 | Litchford | 342/37 |
| 4,171,114 | 10/1979 | Marden | 410/3 X |
| 4,309,706 | 1/1982 | Mosko | 342/427 |
| 4,536,763 | 8/1985 | Von Pieverling | 342/107 |
| 4,584,582 | 4/1986 | Munger | 342/373 |
| 4,758,840 | 7/1988 | Dardenne et al. | 342/75 X |

Primary Examiner—Thomas H. Tarcza
Assistant Examiner—Tod Swann
Attorney, Agent, or Firm—Sandler, Greenblum & Bernstein

[57] ABSTRACT

The present invention pertains to a radiowave relay station in which image information or the like is transmitted by a helicopter from a first station to a second station. A direction finding device is provided which detects the direction of a transmitting source, i.e., a first station. The direction finding device calculates the vertical directional angle $\phi$ representing the direction of an incoming radiowave which is transmitted from the first station. This direction finding device allows the helicopter performing a relay function to fly rapidly to a contact point with the first station, i.e., in a vicinity of the first station. The direction finding device may also provide information to control an antenna driving portion for adjusting a receiving antenna located on the helicopter.

13 Claims, 6 Drawing Sheets ( 15A, 15B --- NON-REFLECTIVE TERMINALS )

Σ PATTERNS

Δ PATTERNS

CROSS SECTION OF
AMPLITUDE PATTERNS

S CURVE

PHASE PATTERNS

RELATIVE PHASE
DIFFERENCE PATTERN

COMMUNICATION SYSTEM FOR HELICOPTER

BACKGROUND OF THE INVENTION

1. FIELD OF THE INVENTION

The present invention pertains to a communication system for a helicopter which allows access to relay data-containing information carried by radiowaves transmitted from fixed stations on the ground or from mobile stations such as flying vehicles.

2. DESCRIPTION OF THE RELATED ART

It often occurs that one partner in a telecommunication operation happens to be an aircraft. Helicopter relay systems have utilized in the broadcasting industry, for gaining access to information in a real-time manner which is gathered in a remote place.

In such a relay system, images gathered on the ground are first received through a microwave transit trunk by a helicopter, and then are re-transmitted by the helicopter to a base station.

To realize the above-mentioned relay system, first, a helicopter must be near enough to a transmitting source on the ground to allow stable communication. Second, it is desirable to employ a directional antenna for better reception. In this case, however, it is necessary to first gain information regarding the direction of the communication partner in order to point the directional antenna in the appropriate direction.

In both of these cases, it is necessary for a helicopter to determine the direction of the transmitting source.

As regards the former method, i.e., contacting a transmitting source, two methods have been conventionally utilized: A first method has the helicopter approach the transmitting source with the help of navigation machinery aboard the helicopter, while information is exchanged on the location of the helicopter and the transmitting source. This exchange of information is carried out by voice communication assisted by different communication lines before or during flight. A second method has the helicopter approach the transmitting source, while signs on the ground are detected by vision.

Unfortunately, however, adjusting a direction antenna appropriately in the direction of a communication partner demands information on the direction of the partner which is much more accurate and reliable than that required for the above-mentioned methods of contacting the transmitting source. For this reason, realizing these methods involves a number of difficulties in terms of accuracy.

In the first method, for, contacting the transmitting source, the flight direction is determined based on information obtained from the navigation gear together with reference to a map. This operation is troublesome to the pilot, and furthermore the information on the direction of the transmitting source is inaccurate. It may be practically impossible to adapt this method to particularly small helicopters, since the number of crew members is limited. Further, in the second method, i.e., relying on human vision, the success of the method depends upon weather conditions, and thus it may be impossible to contact or locate the transmitting source due to poor visibility.

When communication and its relay are performed by using a conventional helicopter, a problem exists in that the full relay capability inherent in the use of the aircraft is not utilized due an inability to effectively determine of with sufficient accuracy and reliability, the direction of the communication partner during flight.

SUMMARY OF THE INVENTION

It is an object of the present invention to overcome the above problem and to provide a communication system for a helicopter which permits easy detection of the direction of a transmitting source, thereby allowing the helicopter to rapidly navigate for setting a transit trunk (to approach the transmitting source). The communication system further permits the helicopter to increase communication distances for relay purposes.

In order to achieve the above-described object, according to the present invention, a helicopter communication system comprises a relay transmitting-receiving antenna portion which is equipped aboard the helicopter and which is not only for receiving information transmitted from a first station, this first station being a radiowave transmitting source, but also for transmitting the information to a second station, this second station being a receiving station. A relay transmitter-receiver is equipped with the relay transmitting-receiving antenna portion, and a direction finding device for detecting the location of the first station.

The direction finding device comprises a direction finding antenna; a receiver for performing predetermined signal processing based on the information received by the direction finding antenna in order to output a plurality of direction computing elements for calculating the location of the first station; and a control device for calculating and outputting the vertical directional angle $\theta$ and horizontal directional angle $\phi$ in the direction of an incoming radiowave which is received, based on the output from the receiver, by the direction finding antenna.

An indicated output from a display device from the control device enables a pilot to navigate the helicopter toward the contact point with a first station.

Other features and advantages of the present invention will become apparent from the following Description of the Preferred Embodiments when read with reference to the attached drawings.

DESCRIPTION OF THE PREFERRED EMBODIMENTS

An embodiment of the present invention will now be described with reference to FIGS. 1 to 5.

Figure 1:
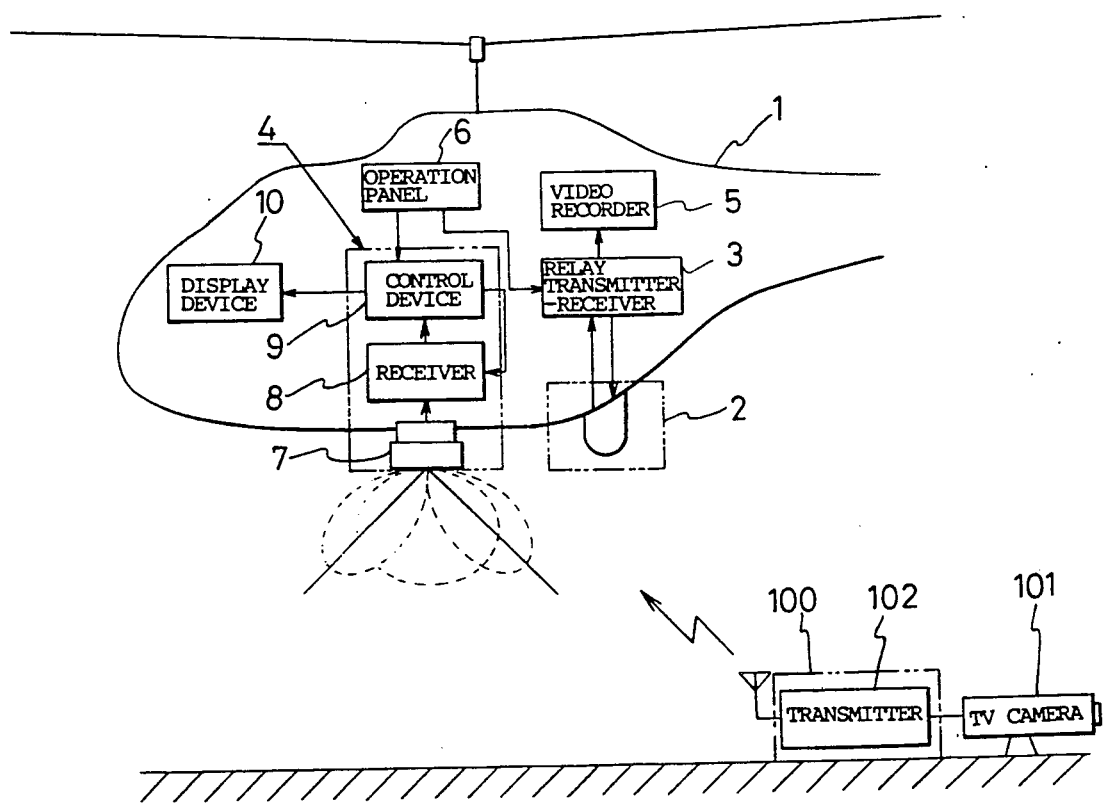
FIG. 1 is a view showing the overall configuration of a communication system for a helicopter associated with an embodiment according to the present invention.

Numeral 1 in FIGS. 1 to 5 indicates a helicopter. As shown in FIG. 1, the helicopter 1 is equipped with a relay antenna 2 for receiving signals transmitted from a fixed station A on the ground as well as for transmitting the received signals to another fixed station (not shown) on the ground, and is also equipped with a relay transmitter-receiver 3. The same helicopter 1 is further equipped with a direction finding means 4.

In this embodiment, a non-directional antenna is utilized as the relay antenna 2. The relay transmitter-receiver 3 is equipped with a video recorder 5. The relay transmitter-receiver 3 is so designed that its start, stop and output at an appropriate speed are controlled by the commands which are set and input by means of an operation panel 6.

The direction finding means 4 comprises a direction finding antenna 7, a receiver 8 for performing predetermined signal processing based on the information received by the direction finding antenna 7 in order to output a plurality of direction computing elements for calculating the location of one station, and a control device 9. Control device 9 calculates the vertical directional angle $\theta$ and horizontal directional angle $\phi$ in the direction of an incoming radiowave which is received, based on the output from the receiver 8, by the direction finding antenna 7. Numeral 10 indicates a display device.

In this embodiment, the control device 9, in addition to controlling the receiver 8, processes and displays given angle information, transfers data to and from other devices, and so on. The display device 10 displays (to a pilot) angle information, such as the incoming direction of a radiowave, which is received by the direction finding antenna 7 and receiver 8. Further, the relay transmitter-receiver 3 receives signals from the ground via the non-directional antenna 2. The video recorder 5 videotapes image information received by the relay transmitter-receiver 3.

Numeral 100 indicates a ground station as a first station, and has a transmitter 102 as well as a camera 101 which outputs image signals.

The control device 9 associated with the direction finding means 4 is provided with the display device 10 and the operation panel 6. Settings may be set by means of the operation panel 6 to control the operation of the control device 9.

Figure 2:
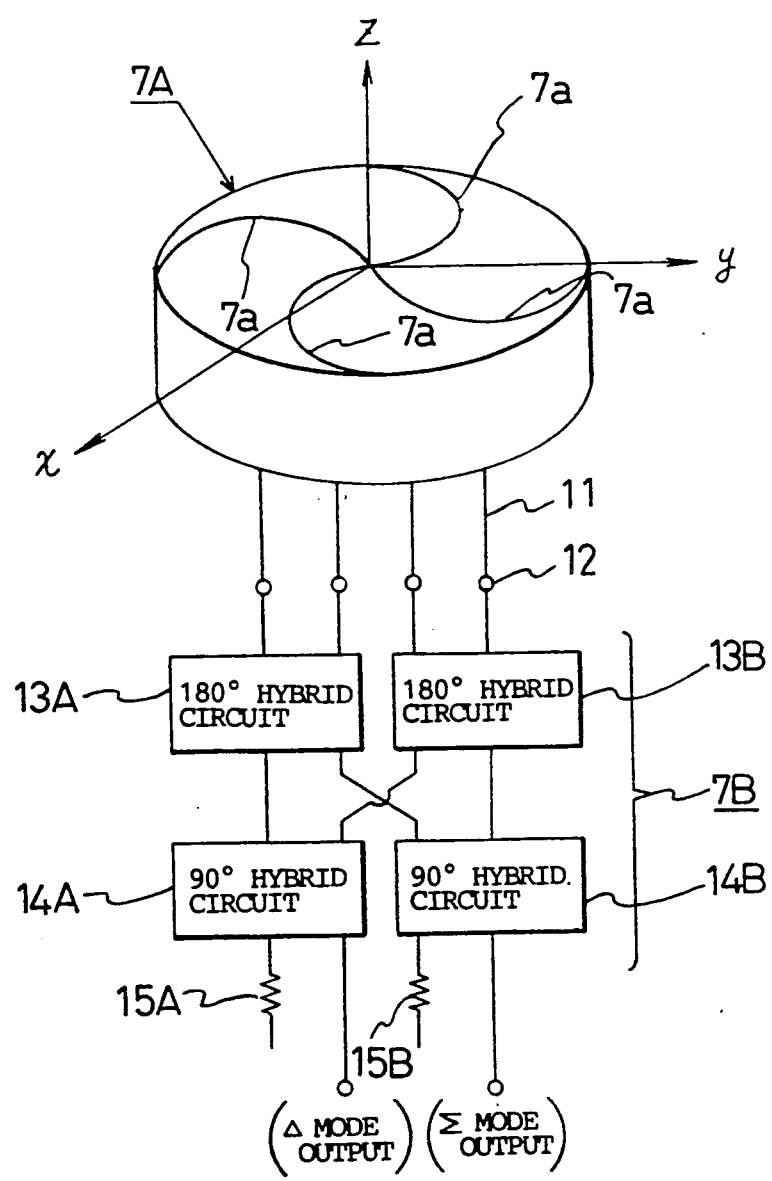
FIG. 2 is an explanatory view showing a dual mode spiral antenna.

As shown in FIG. 2, for the direction finding antenna 7 in this embodiment, a dual mode spiral antenna is utilized which comprises an antenna element 7A having four vortical electrodes 7a. In addition mode forming circuitry 7B separately outputs, based on signals received by the antenna element 7A, an $\Sigma$ mode output and a $\Delta$ mode output for computing the direction of an incoming signal.

The vortical electrodes 7a of the antenna element 7A are all identical in shape. The received electric power coming from the individual electrodes 7a is connected to the mode forming circuitry 7B through transmission lines 11.

In most cases, the electrodes 7a are formed on a plane; however, they may be formed on a conical face or a spherical face. FIG. 2 shows four vortical electrodes 7a formed on a plane with four output terminals 12 attached to the electrodes 7a.

The mode forming circuitry 7B functions to separate only desired mode components from the output of the antenna element 7A, and is comprised of 180° hybrid circuits 13A, 13B comprising a branch circuit, 90° hybrid circuits 14A, 14B comprising a phase shifter, etc. Although the circuitry shown in FIG. 2 is an example of a four-electrode antenna, a different number of electrodes may be utilized. The circuitry may be altered in accordance with the number of electrodes.

High frequency electric power, received by the antenna element 7A, induces on the antenna element 7A a current corresponding to the modes in accordance with the number of turns. In this embodiment, among other modes, a 1 $\lambda$ mode (called $\Sigma$ mode) and a 2 $\lambda$ mode (called $\Delta$ mode) are utilized. The 1 $\alpha$ mode (called $\Sigma$ mode) is strongly received in the upper circular portion of the spiral antenna, this portion having substantially the same circumference length as the wavelength of a received signal. The 2 $\lambda$ mode (called $\Delta$ mode) is received in the upper circular portion of the spiral antenna, this portion having a circumference length twice the wavelength of the received signal.

The mode forming circuitry 7B "mode-separates" the signal received by the antenna element 7A. The 90° hybrid circuits 14A, 14B generate concurrent and separate $\Sigma$ mode and $\Delta$ mode outputs. The electric power of other modes flows to non-reflective terminals 15A, 15B.

The $\Sigma$ mode and $\Delta$ mode outputs are thus obtained at the respective terminals by using the direction finding antenna 7 which is a dual mode spiral antenna as shown in FIG. 2.

In this embodiment, because of the operations of the receiver 8 and the control device 9, directions are determined by using the amplitude ratio of the $\Sigma$ mode and $\alpha$ mode outputs and phase differences between the two modes.

FIGS. 3 (a) to (d) are explanatory views showing the amplitude patterns and the coordinate systems of the dual mode spiral antenna, illustrating the principle of direction finding in accordance with the present invention. FIG. 3(a) shows $\Sigma$ patterns, FIG. 3(b) shows $\Delta$ patterns, FIG. 3(c) is a cross section of amplitude patterns, and FIG. 3(d) shows an S curve.

Figure 3A:
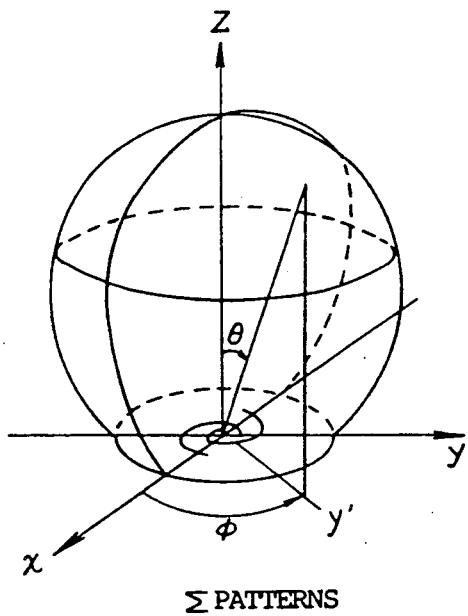
FIGS. 3 (a) to (d) are explanatory views showing the amplitude patterns and the coordinate systems of the dual mode spiral antenna.

When the antenna element 7A side shown in FIG. 2 is deemed to be a single antenna from the viewpoint of the $\Sigma$ mode terminal, the amplitude pattern forms a pattern, as shown in FIG. 3(a), having a peak in a positive direction of the Z axis. This pattern is called a $\Sigma$ pattern.

Figure 3B:
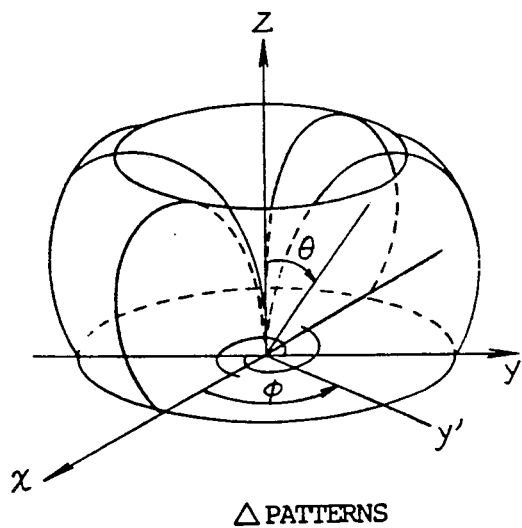

Similarly, when the antenna element 7A side shown in FIG. 2 is deemed to be a single antenna from the viewpoint of the $\Delta$ mode terminal, the amplitude pattern forms a pattern, as shown in FIG. 3(b), having a null point in a positive direction of the Z axis. This pattern is called a $\Delta$ pattern.

The $\Sigma$ and $\Delta$ patterns respectively form rotation symmetry shapes with respect to the Z axis, regardless of an angle (vertical angle) $\phi$ in FIG. 3.

Figure 3C:
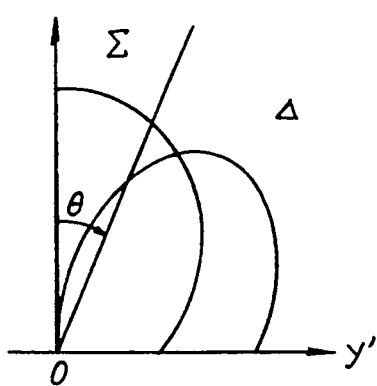
Figure 3D:
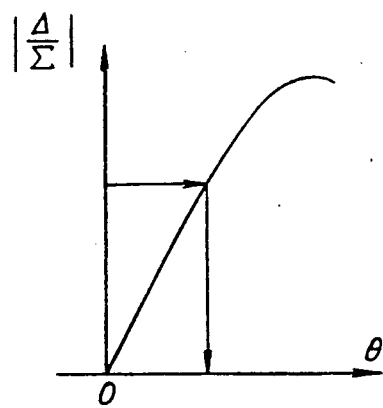

FIG. 3(c) is a cross section of the amplitude patterns by which the cross sections of FIGS. 3(a) and 3(b) are superposed. FIG. 3(d) is a view showing an S curve in which an angle (horizontal angle) $\phi$ in FIG. 3(c) is plotted on the horizontal axis, whereas the $\Sigma$ pattern-$\Delta$ pattern amplitude ratio $|\Delta/\Sigma|$ is plotted on the vertical axis.

When the dependency of the amplitude ratio of $\Sigma$ mode current and $\Delta$ mode current in the $\theta$ direction is previously measured with the aid of FIG. 3(c), and when the function form of the dependency and the amplitude ratio $|\Delta/\Sigma|$ are determine, $\theta$ can be ascertained, $\theta$ being another component of angle information representing the direction of an incoming radiowave (see FIGS. 3(a)(b)).

Figure 4A:
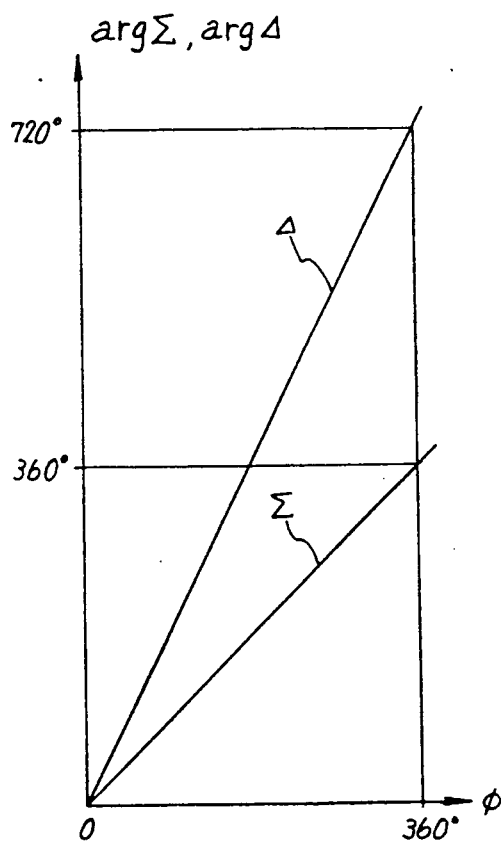
FIGS. 4 (a) and (b) are explanatory views showing the phase patterns of the dual mode spiral antenna.
Figure 4B:
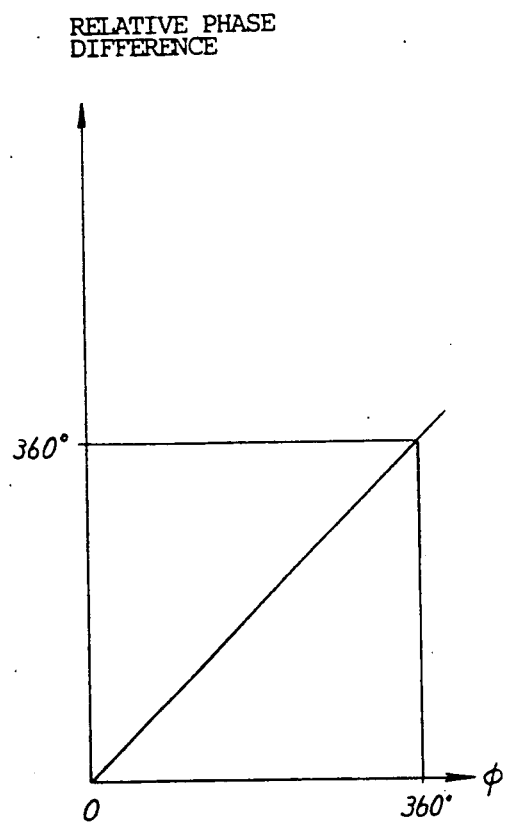

FIGS. 4 (a) and (b) are explanatory views showing the phase patterns of the dual mode spiral antenna with respect to $\phi$. FIG. 4(a) shows phase patterns, "arg $\Sigma$" and "arg $\Delta$", and FIG. 4(b) shows a relative phase difference pattern.

As shown in FIG. 4(a), the phase patterns of the $\Sigma$ and $\Delta$ modes depend solely on a horizontal direction angle $\phi$, and not on a vertical direction angle $\theta$. The $\Sigma$ mode phase pattern varies by 360° in correspondence with a 360° variation in the horizontal direction angle $\phi$, while on the other hand, the $\Delta$ mode phase pattern varies by 720°.

Hence, as shown in FIG. 4(b), when a relative phase difference is plotted against the horizontal direction angle $\phi$, linear properties are obtained in which the phase difference varies by 360° with respect to the variations in the horizontal direction angle $\phi$.

Consequently, when the above phase relationship is previously measured, and when the function form of the relationship and the phase differences of both the modes are determined, the $\phi$ can be ascertained, the $\phi$ being another component of angle information representing the direction of the incoming radiowave (see FIGS. 3(a)(b)).

As has been described above, the dual mode spiral antenna shown in FIG. 2 provides three-dimensional angle information representing the direction of an incoming radiowave. In this case, there is an advantage in that the dual mode spiral antenna may also be applied to radiowaves having undergone pulse modulation, since the signals in the $\Sigma$ and $\Delta$ modes are simultaneously obtained.

Figure 5:
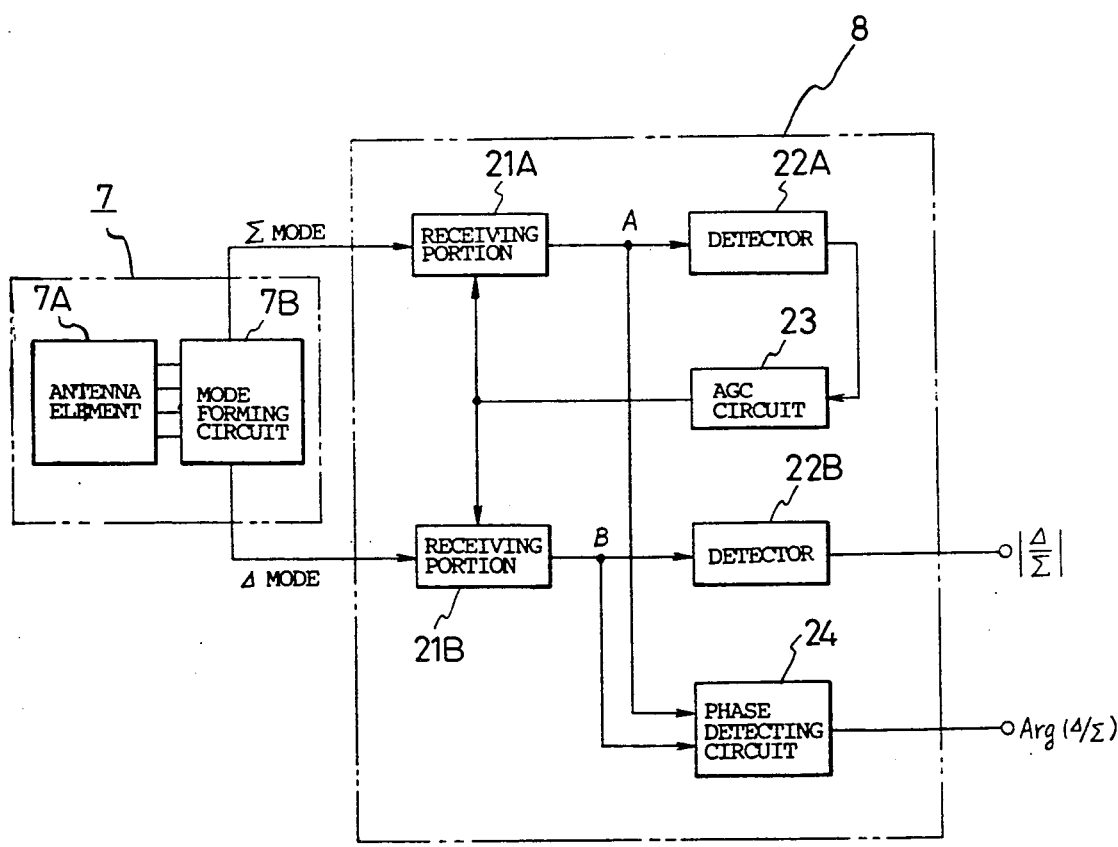
FIG. 5 is a circuit diagram illustrating an example of a concrete configuration associated with the antenna and a receiver.

FIG. 5 is a circuit diagram illustrating the concrete configuration of the direction finding antenna 7 and the receiver 3 both of which have already been described together with reference to FIG. 1.

The direction finding antenna 7 comprises, as shown in FIG. 2, an antenna element 7A and the mode forming circuitry 7B from which the $\Sigma$ and $\Delta$ mode signals transmit.

Furthermore, in the receiver 8 for finding directions, the gains of 2-channel receiving portions 21A, 21B vary as a function of the signals received from the outside. The receiving portions 21A, 21B perform various operations, such as frequency conversion, frequency selection and amplification for the $\Sigma$ and $\Delta$ mode signals, respectively.

Moreover, detectors 22A, 22B detect $\Sigma$ and $\Delta$ mode outputs. The $\Sigma$ mode channel output from the detector 22A is transmitted to an AGC (automatic gain) circuit 23. The AGC circuit 23 not only controls the gain of the receiving portion 21A associated with the $\Sigma$ mode channel but also provides the same amount of gain as that of the receiving portion 21A to the receiving portion 21B associated with the $\Delta$ mode channel so that the $\Sigma$ mode channel amplitude of an input A with respect to the detector 22A becomes a fixed value.

Consequently, the output amplitude of the $\Sigma$ mode channel normalizes the output amplitude of the $\Delta$ mode channel, and the $\Delta$ mode channel output amplitude of an input B with respect to the detector 22B becomes a signal representing the output ratio $|\Delta/\Sigma|$ of the $\Delta$ and $\Sigma$ modes.

In addition, parts of signals branched at points A and B are respectively transmitted to a phase detecting circuit 24. The phase detecting circuit 24 detects the branched signals in order to output a signal arg ($\Delta/\Sigma$) corresponding to the phase differences in the two modes.

Two pieces of angle information on the horizontal direction and vertical direction for received radiowaves are thus obtained. The obtained information on the direction angles is input to the control device 9 shown in FIG. 1 and is indicated on the display device 10 to the pilot after being converted into the coordinate system aboard the helicopter.

For these reasons, according to the present invention, when a helicopter is utilized for relay purposes, it can determine the direction of radiowaves once the radiowaves are transmitted from the ground. When polar coordinates are utilized to indicate the direction, and when the length of a radius vector is assigned to the angle $\theta$ and an argument is assigned to the angle $\phi$ in FIG. 3, the pilot can navigate, by flying so that the display of the coordinates comes to the center of the screen, indicating when the helicopter is just above a ground station.

As has been described above, according to this embodiment, it is quite easy to make a desired contact with any stations. At the same time information, such as TV images and voices, transmitted through the transmitter 102 from the camera 101 of the ground station 100, can be recorded aboard the helicopter 1.

The information thus recorded may be directly transmitted to the home station or may be transmitted to other stations via a relay system.

Another embodiment of the present invention will now be described with reference to FIG. 6, in which the same components as those in FIG. 1 will be designated by the identical numerals.

Figure 6:
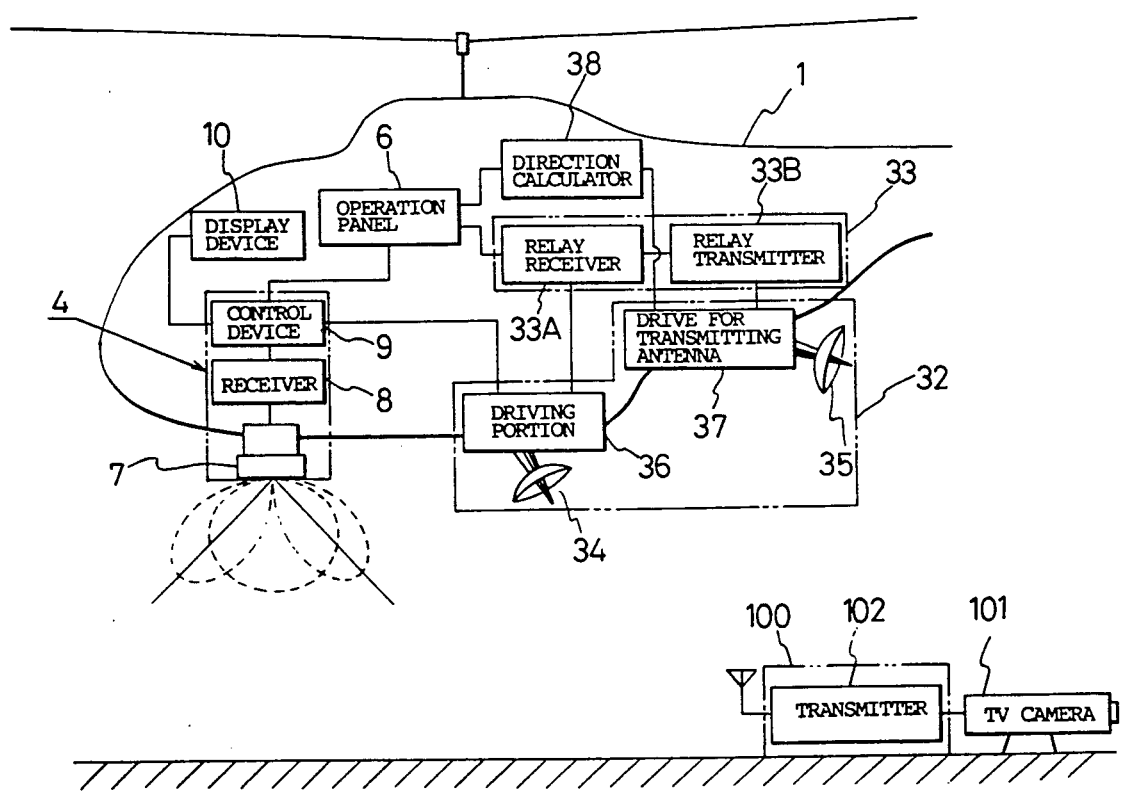
FIG. 6 is a view showing the overall configuration of a communication system for a helicopter associated with another embodiment according to the present invention.

As shown in FIG. 6, a helicopter 1 is equipped with a relay transmitting-receiving antenna portion 32 for receiving signals transmitted from a ground station 100 or the like as well as for transmitting the received signals to another station (not shown), and is also equipped with a relay transmitter-receiver 33. The same helicopter 1 is further equipped with a direction finding means 4.

The relay transmitting-receiving antenna portion 32 comprises a first directional antenna 34 for receiving signals transmitted from the above-mentioned ground station 100, a second directional antenna 35 for transmitting the received signals to another fixed station on the ground, a first antenna driving portion 36 for driving the first directional antenna 34 to set its direction, and a second antenna driving portion 37 for driving the second directional antenna 35 to set its direction. Further, the relay transmitter-receiver 33 comprises a relay receiver 3A having a built-in video recorder for receiving purposes only and a relay transmitter 33B for transmitting information, which is received and recorded by the relay receiver 33A, to other stations.

The first antenna driving portion 36 of the relay transmitting-receiving antenna portion 32 first receives directional angle information from the control device 9 and then sets, based on the information, the first directional antenna 34, which serves as a receiving antenna, to the direction of the ground station 100.

Furthermore, the second antenna driving portion 37 is provided with a direction calculator 38 which determines the direction of a sender (station) of the received information. The direction calculator 38 functions to calculate the locations of other stations which are specified beforehand, this calculation being based on the operation panel-stored information regarding the present location of the helicopter. The output of the direction calculator 38 drives the second antenna driving portion 37 to direct the second directional antenna 35 to a station which will receive information.

According to the embodiment described with reference to FIG. 6, the first directional antenna 34 is automatically controlled to be appropriately directed to the transmitter 102 on the ground, thereby greatly increasing potential communication distances. In this case, even if a signal received from a ground station should encounter a hit, for example, if radiowaves are momentarily interrupted due to an overpass while an automobile is in motion, the minimum amount data may be omitted. This is because it is possible to trace the signal, owing to the extensive coverage area of the dual mode spiral antenna, immediately after the communication line becomes normal.

Moreover, helicopter relay is realized in such a manner that information received from the relay receiver 33A can be transmitted to a relay partner through use of the relay transmitter 33B by means of a transmitting antenna, i.e., the second directional antenna 35. At this time, the direction calculator 38 calculates the direction of the relay partner. The transmitting antenna driving portion 37 drives, based on the calculated direction information, the second directional antenna 35 in order to accurately direct the second directional antenna 35 in the direction of the relay partner.

Thus, according to the embodiment described with reference to FIG. 6, the helicopter relay over long distances can be easily realized.

As has been described, according to the present invention, the direction of a target transmitting source is readily determined with a simple configuration. It is further possible not only to navigate the helicopter for making contact with the transmitting source for relay purposes, but also to markedly increase communication distances.

According to the present invention, it is possible to provide an unprecedented, excellent helicopter communication system which makes the best use of convenience in helicopter relay communication.

Although ground stations are exemplified as stations for transmitting and receiving information in the above-described embodiments, the present invention is not limited to these. The present invention may also be applied to maritime stations, flying vehicle stations or mobile stations on the ground.

The invention has been described in detail with particular reference to the preferred embodiments thereof, but it will be understood that variations and modifications of the invention can be made within the spirit and scope of the invention.

What is claimed is:

1. A mobile vehicle communication system comprising:

a relay tarnsmitting-receiving antenna portion which is provided aboard siad mobile vehicle and which not only receives information transmitted from a first station, said first station being a radiowave transmitting source, but also transmits said information to a second station, said second station being a receiving station;

a relay transmitter-receiver equipped with said relay transmitting-receiving antenna portion; and direction finding means for detectign the location of said first station;

said direction finding means comprising:

a direction finding antenna, and a processor for performing predetermined signal processign based on the information received by said direction finding antenna in order to output a plurality of directio computing elements for calculating the location of said first station, and means for providing information to control a portion of said relay transmitting-receiving antenna portion.

2. A mobile vehicle communication system according to claim 1, wherein said first station is a fixed station on the ground.

3. A mobile vehicle communication system according to claim 1, wherein said first station is a mobile station on the ground.

4. A mobile vehicle communication system according to claim 1, wherein said first station is a mobile station at sea.

5. A mobile vehicle communication system according to claim 1, wherein said first station is a station aboard another aircraft.

6. A mobile vehicle communication system according to claim 1, wherein said direction finding antenna is a dual mode spiral antenna which comprises:

an antenna element having more than three vortical electrodes, the number of said electrodes being even numbers; and a mode forming circuitry for separately outputting, based on the signals received by said antenna element, $\Sigma$ and $\Delta$ modes for the purpose of computing the direction of incoming radiowaves.

7. A mobile vehicle communication system according to claim 1, wherein said receiver comprises:

a first computing function for computing and outputting an amplitude ratio $|\Delta/\Sigma|$ in which a $\Sigma$ mode output amplitude normalizes a $\Delta$ mode output amplitude; and a second computing function for phase-detecting the $\Delta$ and $\Sigma$ mode outputs in order to compute and output phase differences arg $(\Delta/\Sigma)$; and wherein said control device comprises a direction angle calculating function for calculating and outputting the vertical directional angle $\theta$ and horizontal directional angle $\phi$ both of which indicate the direction of an incoming radiowave received by said antenna element, this calculation and output being based on said amplitude ratio $|\Delta/\Sigma|$ and phase differences arg $(\Delta/\Sigma)$.

8. A mobile vehicle communication system according to claim 1, wherein said relay transmitting-receiving antenna portion comprises a non-directional antenna.

9. A mobile vehicle communication system according to claim 1, wherein said relay transmitting receiving antenna portion comprises:

a first directional antenna for receiving signals transmitted from said first station;

a second directional antenna for transmitting said received signals to a second station;

a first antenna driving portion for driving said first directional antenna to set its direction; and a second antenna driving portion for driving said second directional antenna to set its direction.

10. A mobile vehicle communication system according to claim 9, wherein said first antenna driving portion is driven by said control device to set said first directional antenna in the direction of said first station.

11. A mobile vehicle communication system according to claim 9, wherein said second antenna driving portion is provided with a direction calculating circuit, and said second antenna driving portion is driven in accordance with the output of said direction calculating circuit to set said second directional antenna in the direction of said second station.

12. A mobile vehicle communication system according to claim 1, wherein said mobile vehicle comprises a helicopter.

13. A mobile vehicle communication system according to claim 1, said system further comprising a control device for calculating and outputting the vertical directional angle $\theta$ and horizontal directional angle $\phi$ in the direction of an incoming radiowave which is received, based on the ouput from said receiver, by said direction finding antenna.

* * * * *